US006089475A

United States Patent [19]

Reiter et al.

[11] Patent Number: 6,089,475

[45] Date of Patent: Jul. 18, 2000

[54] ELECTROMAGNETICALLY OPERATED VALVE

[75] Inventors: Ferdinand Reiter, Markgröningen; Dieter Maier, Gerlingen; Ferdinand Hümmer, Breitengüssbach, all of Germany

[73] Assignee: Robert Bosch GmbH, Stuttgart, Germany

[21] Appl. No.: 09/297,957

[22] PCT Filed: Jul. 17, 1998

[86] PCT No.: PCT/DE98/02003

§ 371 Date: Jul. 8, 1999

§ 102(e) Date: Jul. 8, 1999

[87] PCT Pub. No.: WO99/13212

PCT Pub. Date: Mar. 18, 1999

[30] Foreign Application Priority Data

Sep. 11, 1997 [DE] Germany ........................... 197 39 850

[51] Int. Cl.$^{7}$ ............................... B05B 3/16; F16K 31/02

[52] U.S. Cl. .................................... 239/585.1; 251/129.21

[58] Field of Search ............................. 239/585.1, 585.3, 239/585.4, 900; 251/129.21, 129.14

[56] References Cited

U.S. PATENT DOCUMENTS

| | | | |
|---|---|---|---|
| 5,199,648 | 4/1993 | Fujikawa | 239/585.4 |
| 5,360,197 | 11/1994 | Reiter et al. | 239/585.4 |
| 5,580,001 | 12/1996 | Romann et al. | 239/900 |
| 5,921,469 | 7/1999 | Romann | 239/900 |

*Primary Examiner*—Andres Kashnikow
*Assistant Examiner*—Davis Hwu
*Attorney, Agent, or Firm*—Kenyon & Kenyon

[57] ABSTRACT

The electromagnetically operable valve has the an axially moveable valve needle which is formed from an armature, a valve-closure member and a connecting part connecting the two parts. The tubular connecting part has an elongated slit which, because of widenings of the starting sheet-metal part, has a smaller opening width at the end facing the valve-closure member than over its remaining axial extension. Thus, the valve-closure member can be attached very securely at the lower end of the connecting part by a welded seam, avoiding disadvantageous sink marks. The valve is suitable to be used in fuel-injection.

9 Claims, 2 Drawing Sheets

ELECTROMAGNETICALLY OPERATED VALVE

BACKGROUND INFORMATION

German Patent Application 38 31 196 describes an electromagnetically operable valve which has a valve needle that is axially moveable in a through-hole of a valve-seat support. The valve needle is formed of a cylindrical armature, a spherical valve-closure member and a tubular or sleeve-shaped connecting part connecting both structural elements to one another. The connecting part is produced from a flat sheet metal which is subsequently rolled or bent until it assumes a cylindrical, sleeve-like shape. In this form, the connecting part has a slit extending over its entire axial length which can run either axially-parallel or at an angle to the longitudinal valve axis. The two end faces of the sheet metals used, running in the longitudinal direction, lie opposite each other with a constant clearance forming the slit between them. When producing a fixed joining between the connecting part and the valve-closure member by applying a welded seam using a laser (continuous wave laser), disadvantageous sink marks develop at the relatively broad slit. In this context, a sink mark is an area at which less material is available for fusing, and at which material consequently falls inwardly. As a consequence, at such a location the welded seam has a dent-shaped, concave depression which represents a certain disturbance of the welded seam. Although the laser ray is not masked out when sweeping over the slit, the welded seam may even have a break in the area of the slit.

German Patent Application No. 40 08 675 described an electromagnetically operable valve, in which the valve-closure member is attached to the connecting part by a welded seam, the welded seam being interrupted at least in the area of the longitudinal slit, or even additionally at further spots in the circumferential direction.

SUMMARY OF THE INVENTION

The electromagnetically operable valve of the present invention has the advantage that it can be produced cost-effectively in a particularly simple manner. It yields the advantage of a connecting part having relatively great tolerances. With low weight and great stability, the connecting part has a large-area hydraulic flow cross-section. Because of the slit extending over the entire axial length, the connecting part has elasticity, thus facilitating the connections to the armature and the valve-closure member. The springy flexibility permits the connecting part to be inserted under tension into the inner opening of the armature, thus avoiding a disadvantageous formation of a cutting when mounting the armature. On the other hand, the valve-closure member can be secured very easily and reliably at the end of the connecting part facing away from the armature, since the slit has a markedly reduced opening width. When using a continuous laser weld (continuous wave laser) to secure the valve-closure member to the connecting part, a welded seam is advantageously attained which has no substantial break. Reducing the width of the slit at one end of the connecting part results in an increase of the welded cross-section and almost to an avoidance of sink marks of the welded seam at the slit edges. The slit of the connecting part, produced from a non-magnetic material, prevents the formation of an unwanted eddy current.

It is also advantageous to produce the connecting part from a sheet metal, in that sheet-metal sections are first punched out in a substantially rectangular shape and subsequently rolled or bent. The respective elongated end faces of the sheet-metal section lie opposite each other with a small clearance, thus forming the slit of the connecting part.

The fixed joining of the valve-closure member which, for example, is spherical, to the end of the connecting part, formed with a tapering of the slit, is attainable by a welded seam running completely around by 360°, which has a very high dynamic strength.

At the lower end of the connecting part facing the valve-closure member, at the periphery exactly opposite the slit, it is advantageous to provide a notch which ensures a reliable scavenging of the valve needle. The notch is advantageously drop-shaped, a very small opening width existing directly at the lower end face of the connecting part. Thus, the danger of a break in the welded seam is markedly reduced. However, sink marks of the welded seam at the notch would not be critical, since the dynamic stress is very much less than at the slit running over the entire axial length of the connecting part.

It is also advantageous to provide the wall of the connecting part with a plurality of flow orifices penetrating it, in order to prevent the flow conditions in the valve from undesirably influencing the ejected fuel.

DETAILED DESCRIPTION

Figure 1:
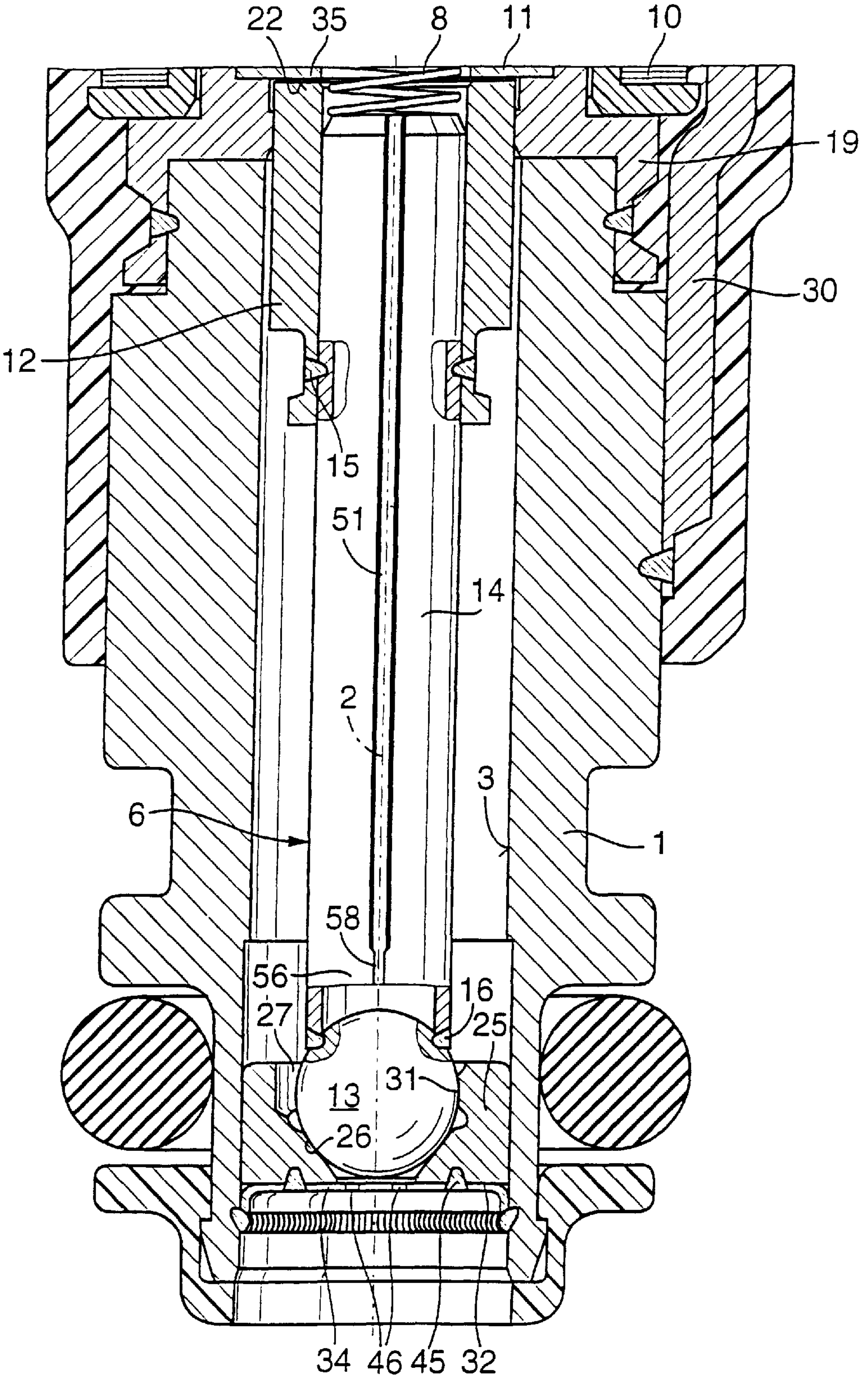
FIG. 1 shows a partial view of an electromagnetically operable valve according to the present invention.

FIG. 1 shows a partial view of an exemplary embodiment of an electromagnetically operable valve in the form of an injection valve for fuel-injection systems of mixture-compressing internal combustion engines having externally supplied ignition. The valve has a tubular valve-seat support 1, in which is formed a longitudinal bore hole 3 concentric to a longitudinal valve axis 2. An axially moveable valve needle 6 is arranged in longitudinal bore hole 3.

The valve is actuated electromagnetically in a conventional manner. An electromagnetic circuit, shown only partially, having a solenoid coil 10, a core 11 and an armature 12, is used for the axial movement of valve needle 6, and thus for opening the valve against the spring tension of a return spring 8 and for closing the valve. Valve needle 6 is formed by armature 12, a for example spherical valve-closure member 13 and a connecting part 14 joining the two individual parts, connecting part 14 having a tubular shape. Return spring 8 is braced with its lower end against the upper end face of connecting part 14. Armature 12 is joined by a welded seam 15 to the end of connecting part 14 facing away from valve-closure member 13 and is aligned with core 11. On the other hand, valve-closure member 13 is also securely joined to the end of connecting part 14 facing away from armature 12 by, for example, a welded seam 16. Solenoid coil 10 surrounds core 11 which represents the end, surrounded by solenoid coil 10, of a fuel intake nipple that is not further described and is used for feeding the medium, in this case fuel, to be metered in by the valve.

Concentric to longitudinal valve axis 2, a tubular, metallic intermediate part 19 is tightly (e.g., imperviously) joined to the lower end of core 11 and to valve-seat support 1 by, e.g. welding. In the downstream end of valve-seat support 1, facing away from core 11, a cylindrical valve-seat member 25 is imperviously mounted by welding in longitudinal bore hole 3 running concentrically to longitudinal valve axis 2. Valve-seat member 25 has a fixed valve seat 26 facing core 11.

Solenoid coil 10 is surrounded at least partially in the circumferential direction by at least one conductive element 30, formed, e.g. as a clip and used as a ferromagnetic element, which abuts with its one end against core 11, and with its other end against valve-seat support 1, and is joined to them by, for example, welding, soldering or an adhesive connection.

Used for guiding valve-closure member 13 during the axial movement is a guide opening 31 of valve-seat member 25. At its one lower end face 32 facing away from valve-closure member 13, valve-seat member 25 is concentrically and firmly joined to a, for example, pot-shaped apertured spray disk 34. Valve-seat member 25 and apertured spray disk 34 are joined, for example, by a circumferential, impervious welded seam 45 formed, e.g. by a laser. This type of assembly prevents the danger of an unwanted deformation of apertured spray disk 34 in the region of its at least one, for example four spray orifices 46 formed by eroding or punching.

The insertion depth of the valve-seat part, composed of valve-seat member 25 and apertured spray disk 34, into longitudinal bore hole 3 determines, among other things, the adjustment of the stroke of valve needle 6, since the one end position of valve needle 6, when solenoid coil 10 is not excited, is established by the contact of valve-closure member 13 against the surface of valve seat 26 of valve-seat member 25. The other end position of valve needle 6, when solenoid coil 10 is excited, is established by the contact of an upper end face 22 of armature 12 against a lower end face 35 of core 11. The path between these two end positions of valve needle 6 represents the stroke.

Spherical valve-closure member 13 interacts with the area of valve seat 26 of the valve-seat member 25 that tapers in a frustoconical manner in the direction of flow and is formed downstream of guide opening 31 of valve-seat member 25. Guide opening 31 has at least one flow passage 27 which permits flow of the medium in the direction toward valve seat 26 of valve-seat member 25. On the other hand, flow passages in the form of grooves or flattenings can also be provided on valve-closure member 13.

Figure 2:
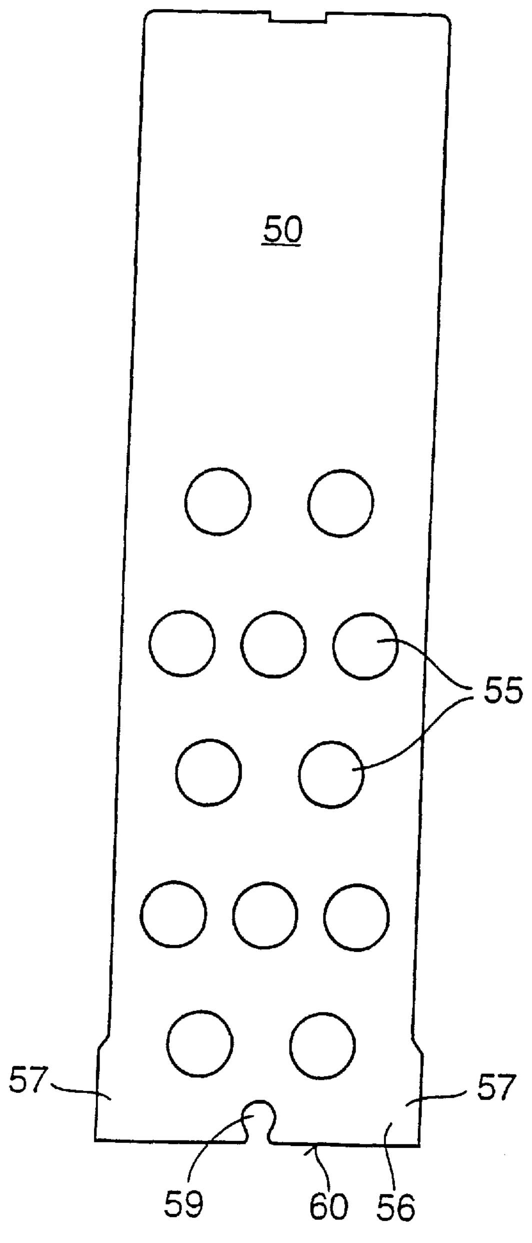
FIG. 2 shows a sheet-metal section for forming a connecting part of an axially moveable valve needle.
Figure 3:
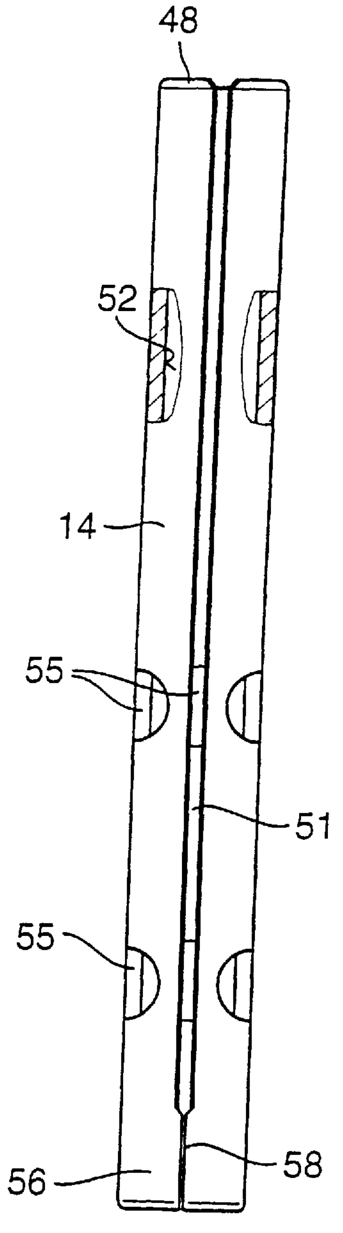
FIG. 3 shows a connecting part as an individual component.

FIG. 3 shows connecting part 14, according to the present invention, of valve needle 6, as an individual component before being firmly joined to armature 12 and valve-closure member 13, and FIG. 2 shows a sheet-metal section 50 from which connecting part 14 can be produced. For example, a chamfer 48 is formed in the shape of a ring at the upstream end of connecting part 14. Provided in the wall of tubular or sleeve-shaped connecting part 14 is an elongated slit 51, completely radially penetrating the wall, which extends over the entire length of connecting part 14, but at the same time has at least two axially running regions of different slit breadth or width in the circumferential direction of connecting part 14.

The fuel flowing from core 11 into an inner longitudinal opening 52 travels through slit 51 outwardly into longitudinal bore hole 3 of valve-seat support 1. Via flow passages 27 in valve-seat member 25 or at the periphery of valve-closure member 13, the fuel arrives at valve seat 26 and spray orifices 46 provided downstream, via which it is ejected into an induction pipe or a cylinder of an internal combustion engine. Slit 51 represents a large-area hydraulic flow cross-section, via which the fuel can arrive very quickly from inner longitudinal opening 52 into longitudinal bore hole 3. The thin-walled connecting part 14 ensures the greatest stability, accompanied by the lowest weight.

To prevent the fuel, which may be flowing asymmetrically toward valve seat 26, from undesirably influencing the jet shape of the fuel ejected out of spray orifices 46, connecting part 14 is optionally provided with a plurality of flow orifices 55 which penetrate the wall of connecting part 14. The, for example, circular flow orifices 55, already introduced into sheet-metal section 50 by punching, are shown by way of example only in sheet-metal section 50 of FIG. 2 and on connecting part 14 in FIG. 3. For example, twelve flow orifices 55 are arranged in alternating rows of two and three in sheet-metal section 50. Changes with respect to number and position of flow orifices 55 can be implemented without difficulty.

Connecting part 14 is manufactured, such that sheet-metal sections 50, similar to the one shown in FIG. 2, having a substantially rectangular shape, are produced, for example, by punching from a flat sheet metal having the thickness of the tubular wall of connecting part 14. Sheet-metal sections 50 have a longer and a shorter extension, the longer extension corresponding to the length in the axial direction of connecting part 14 to be produced, and the shorter extension corresponding roughly to the circumference of connecting part 14 to be produced. At their one end 56, to which valve-closure member 13 is later secured, sheet-metal sections 50 have, on their two longitudinal sides, symmetrical widenings or enlargements 57 jutting out minimally beyond the otherwise rectangular contour.

After sheet-metal sections 50 are punched out with the contour described above, each sheet-metal section is rolled or bent into the shape of the desired connecting part 14, for instance with the aid of a mandrel. In so doing, the respective elongated end faces of sheet-metal section 50 forming connecting part 14 form slit 51, in that they lie opposite one another with a small clearance. While the width of slit 51 in the circumferential direction is, for example, approximately 0.5 mm over the greatest part of its longitudinal extension, in the region of widenings 57, a slit region 58 results having a reduction in width of the slit to approximately 0.1 mm.

At lower end 56 of sheet-metal section 50, a notch 59 is optionally provided which, for example, is arranged in such a way that at the periphery of rolled connecting part 14, it is exactly opposite slit 51. The, for example, drop-shaped notch 59 has only a small opening width at lower end face 60, but at a distance from end face 60, is broader, wider, or more bulbous. Contours (bulb-shaped, balloon-shaped, reverse U-shape) of notch 59 differing from the contour shown in FIG. 2 are equally conceivable. Notch 59 prevents a blind hole from developing in connecting part 14 after valve-closure member 13 is welded on, due to the very narrow slit 51 in slit region 58 at lower end 56. Thus, reliable scavenging of valve needle 6 is completely ensured.

Producing connecting part 14 from a sheet-metal section 50 represents a particularly light and simple type of production which permits the use of different materials and allows mass production in large quantities. The provision of slit 51 in connecting part 14 makes it elastic, so that it is possible to select relatively rough tolerances for the inner opening of armature 12 and for connecting part 14 itself. Because of the elastic flexibility, connecting part 14 can be inserted under tension into the inner opening of armature 12.

Due to the very small opening width of slit 51 in slit region 58 at end 56, and the optionally provided notch 59 at end face 60, and connecting part 14 consequently abuts practically all-around against valve-closure member 13, welded seam 16 is attainable with a very high dynamic strength. Welded seam 16 between connecting part 14 and valve-closure member 13 is produced, for example, which the aid of a "continuous wave laser." In so doing, valve needle 6 is rotated under the continuous laser ray and is continuously welded. Because of the perceptible reduction of slit 51, the welded cross-section is enlarged compared to known slitted valve-needle sleeves, and the sink marks of the welded seam at the slit edges are markedly reduced to the point of almost complete avoidance, such that a continuous welded seam 16 exists which is substantially disturbance-free. In addition, the dynamic stress in the region of notch 59 is less by far than for a slit running over the entire length of connecting part 14, so that a minimal break in welded seam 16 possibly occurring at notch 59 would not be critical.

What is claimed is:

1. An electromagnetically operable valve having a longitudinal valve axis, comprising:

a core;

a solenoid coil at least partially surrounding the core;

a valve seat;

a valve-closure member cooperating with the valve seat;

an armature; and a tubular connecting part connecting the armature to the valve-closure member, the tubular connecting part including a wall and a slit which penetrates the wall, the slit extending for an entire axial length of the tubular connecting part from an end portion of the wall and along a remaining portion of the wall, the end portion facing the valve-closure member, wherein the slit has a first opening width at the end portion and a second opening width along the remaining portion, the first opening width being smaller than the second opening width.

2. The electromagnetically operable valve according to claim 1, wherein the tubular connecting part is formed from a sheet metal.

3. The electromagnetically operable valve according to claim 1, wherein the first opening width is approximately 20% of the second opening width.

4. The electromagnetically operable valve according to claim 1, wherein the tubular connecting part includes at least one flow orifice which penetrates the wall.

5. The electromagnetically operable valve according to claim 1, wherein the tubular connecting part includes a notch which is open toward a lower end face of the tubular connecting part, the notch being disposed at the end portion and on a periphery of the tubular connecting part which is provided exactly opposite to the slit.

6. The electromagnetically operable valve according to claim 5, wherein the notch has a drop-shape, and wherein the first opening width tapers toward the lower end face.

7. The electromagnetically operable valve according to claim 6, wherein the tubular connecting part is formed by:

punching the sheet metal, and subsequently, one of rolling and bending the sheet metal.

8. The electromagnetically operable valve according to claim 7, wherein the sheet metal includes a sheet-metal section which is punched out from the sheet metal for producing the tubular connecting part, the sheet-metal section having a substantially rectangular shape, and wherein an end section of the sheet-metal section corresponds to the end portion, the end section including slightly protruding widened sections at longitudinal sides of the end section.

9. The electromagnetically operable valve according to claim 1, wherein the electromagnetically operable valve is a fuel-injection valve for a fuel-injection system of a mixture-compressing internal combustion engine with an externally supplied ignition.

* * * * *

UNITED STATES PATENT AND TRADEMARK OFFICE

CERTIFICATE OF CORRECTION

PATENT NO. : 6,089,475
DATED : July 18, 2000
INVENTOR(S) : Reiter et al.

It is certified that error appears in the above-identified patent and that said Letters Patent is hereby corrected as shown below:

Abstract,
Line 1, delete "... the ...".
Line 11, after "... fuel injection. "insert -- systems of mixture -- compressing internal combustion engines having externally supplied ignition. --.

Signed and Sealed this

Twenty-fifth Day of September, 2001

Attest:

Nicholas P. Godici

NICHOLAS P. GODICI

*Attesting Officer* *Acting Director of the United States Patent and Trademark Office*